US012663603B2

(12) United States Patent
Hill et al.

(10) Patent No.: US 12,663,603 B2
(45) Date of Patent: Jun. 23, 2026

(54) MODULAR VAULT FOR FIBER OPTIC CABLES

(71) Applicant: Clearfield, Inc., Minneapolis, MN (US)

(72) Inventors: John P. Hill, Oak Grove, MN (US); Donovan Hample, Otsego, MN (US); Brian Larson, Andover, MN (US); William J. Cruzen, Monticello, MN (US); Randy T. VanHorn, Princeton, MN (US)

(73) Assignee: Clearfield, Inc., Minneapolis, MN (US)

( * ) Notice: Subject to any disclaimer, the term of this patent is extended or adjusted under 35 U.S.C. 154(b) by 572 days.

(21) Appl. No.: 18/319,813

(22) Filed: May 18, 2023

(65) Prior Publication Data

US 2024/0385409 A1 Nov. 21, 2024

(51) Int. Cl.
*G02B 6/50* (2006.01)
*B65D 8/00* (2006.01)
*E02D 29/12* (2006.01)
*G02B 6/44* (2006.01)

(52) U.S. Cl.
CPC ............. *G02B 6/501* (2023.05); *B65D 15/24* (2013.01); *E02D 29/12* (2013.01); *G02B 6/4446* (2013.01)

(58) Field of Classification Search
CPC . G02B 6/501; G02B 6/50; G02B 6/46; G02B 6/4446; G02B 6/4441; G02B 6/444; B65D 15/24; B65D 7/12
USPC ....... 220/484, 676, 691, 682, 683, 684, 677; 361/601, 600
See application file for complete search history.

(56) References Cited

U.S. PATENT DOCUMENTS

| | | | | | |
|---|---|---|---|---|---|
| 2,182,201 | A | * | 12/1939 | Harris | C21D 9/0025 |
| | | | | | 220/684 |
| 3,858,755 | A | * | 1/1975 | Tellen | H02G 9/025 |
| | | | | | 220/284 |
| 3,877,601 | A | * | 4/1975 | Evans | H02G 3/081 |
| | | | | | 220/3.3 |
| 3,952,908 | A | * | 4/1976 | Carson | H02B 1/06 |
| | | | | | 220/831 |
| 4,163,503 | A | * | 8/1979 | McKinnon | H02G 9/10 |
| | | | | | 220/254.3 |
| 7,381,888 | B2 | | 6/2008 | Burke et al. | |
| 7,385,137 | B2 | | 6/2008 | Burke et al. | |
| 7,547,051 | B2 | | 6/2009 | Burke et al. | |
| D611,072 | S | | 3/2010 | Shimirak et al. | |

(Continued)

OTHER PUBLICATIONS

CCO-HH-1730/2436, ChallengerOptics, Modular Fast Clip Handhole, https://vimeo.com/804515858, Mar. 3, 2023.

(Continued)

*Primary Examiner* — Robert J Hicks
(74) *Attorney, Agent, or Firm* — TROUTMAN PEPPER LOCKE LLP; Alison L. McCarthy; Aaron E. Johnston

(57) ABSTRACT

A modular utility vault system can include a plurality of panels, a clip, and a cover panel. Each panel can include a first side including a first protrusion, a second side including a second protrusion, a lower side having a first length, and an upper side having a second length. The second length is less than first length. The first side of a panel of the plurality of panels is configured to abut the second side of a second panel thereby causing the first protrusion to abut the second protrusion. The clip can be configured to hold the first protrusion to the second protrusion.

20 Claims, 11 Drawing Sheets

<u>100</u>

(56) References Cited

U.S. PATENT DOCUMENTS

| | | |
|---|---|---|
| 8,050,528 B2 | 11/2011 | Shimirak et al. |
| 8,220,298 B2 | 7/2012 | Burke et al. |
| 8,249,411 B2 | 8/2012 | Burke |
| 8,275,229 B2 | 9/2012 | Shimirak et al. |
| 8,686,289 B2 | 4/2014 | Burke et al. |
| 8,708,183 B2 | 4/2014 | Burke |
| 8,847,070 B2 | 9/2014 | Burke |
| 9,284,751 B2 | 3/2016 | Rickman |
| 9,287,693 B2 | 3/2016 | Burke |
| 10,265,890 B2 | 4/2019 | Burke et al. |
| 10,288,106 B2 | 5/2019 | Lemacks |
| 10,358,285 B2 | 7/2019 | Burke et al. |
| 10,663,688 B2 | 5/2020 | Safranek et al. |
| 10,757,836 B2 | 8/2020 | Lemacks et al. |
| 2024/0361552 A1* | 10/2024 | Landry ................ G02B 6/4471 |

OTHER PUBLICATIONS

ChallengerOptics, FTTH Solutions, https://challengeroptics.com/peds-handhole-splice-enclosures, 2023.

* cited by examiner

100

130

136

134

132

510

138

139

510

120

120

120

117

119

100

136

510

118

136

142

132

118

120

120

116

140

110a

110b

144

110

110    110

110

140

110a

110b

110b

110a

A-A

B-B

136

136

910

136

910

138

138

138

MODULAR VAULT FOR FIBER OPTIC CABLES

FIELD OF THE DISCLOSURE

The present disclosure relates generally to utilities vaults and more particularly to modular utility vault systems.

BACKGROUND

Underground utilities, such as wiring, cables, data transmission lines, telecommunication hardware, and the like, must be protected from the outside environment as well as vandalism, tampering, and animal activity. These same utilities may need to be accessed after installation for upgrades, maintenance, and expansion. Thus, enclosures used to house and access underground utilities need to be robust and easy to install. However, currently available underground utility vaults are bulky and difficult to assemble or are fragile and do not provide sufficient protection to the buried utilities.

SUMMARY

According to one aspect, the present disclosure is directed to a modular utility vault system that can include a plurality of panels, a clip, and a cover panel. Each panel can include a first side including a first protrusion, a second side including a second protrusion, a lower side having a first length, and an upper side having a second length. The second length is less than first length. The first side of a panel of the plurality of panels is configured to abut the second side of a second panel thereby causing the first protrusion to abut the second protrusion. The clip can be configured to hold the first protrusion to the second protrusion.

In some embodiments, the cover panel can include a pedestal or cabinet mounting section including an access opening. The cover panel can further include a cover section.

In some embodiments, the plurality of panels can be configured to form an enclosure having a generally trapezoidal prism shape having a rectangular top defined by the upper sides of the plurality of panels and a rectangular bottom defined by the lower sides of the plurality of panels.

In some embodiments, the rectangular top can be smaller than the rectangular bottom.

In some embodiments, the cover panel can be a rectangular panel with a length and width larger than the rectangular top.

In some embodiments, the first side and the second side of each of the plurality of panels are beveled.

In some embodiments, each of the plurality of panels can further include a plurality of strengthening ribs disposed on a side of the panel. Each of the plurality of strengthening ribs is skewed to at least one of the first side, second side, lower side, or upper side. In some embodiments, the strengthening ribs form a generally diamond shaped grid pattern.

In some embodiments, the clip is configured to slide over a first protrusion and a second protrusion to securely clip the plurality of panels together.

According to another aspect, the present disclosure relates to a modular utility vault system including a plurality of panels that have one or more first protrusions on a first side and a second side including one or more second protrusions. The first side of a panel is configured to abut the second side of a different panel thereby causing a first protrusion to abut a second protrusion. The panels further include a lower side having a first length and an upper side having a second length. The second length is less than first length. Panels can further include a plurality of strengthening ribs disposed on a side of the panel, each of the plurality of strengthening ribs being skewed to at least one of the first side, second side, lower side, or upper side.

In some embodiments, the system can further include a plurality of clips configured to hold a first protrusion to a second protrusion, and a cover panel. The cover panel can include a pedestal or cabinet mounting section including an access opening. The cover panel can further include a cover section.

In some embodiments, the plurality of panels can be configured to form an enclosure having a generally trapezoidal prism shape having a rectangular top defined by the upper sides of the plurality of panels and a rectangular bottom defined by the lower sides of the plurality of panels.

In some embodiments, each of the plurality of clips is configured to slide over a first protrusion a second protrusion to securely clip the plurality of panels together.

In some embodiments, the cover panel can be a split cover panel.

DETAILED DESCRIPTION

Aspects of the present disclosure are directed to modular utility vault systems. The modular utility vault systems disclosed herein have the advantages, among others, of being modular, being packable and repackable, being configured to be assembled and reassembled by an end user and being low cost. The modular utility vault systems disclosed herein are generally useful for creating spaces underground into and out of which cables, fiber optic system components and other assorted transmission lines can be routed, and in which electrical and other equipment can be stored.

Figure 1:
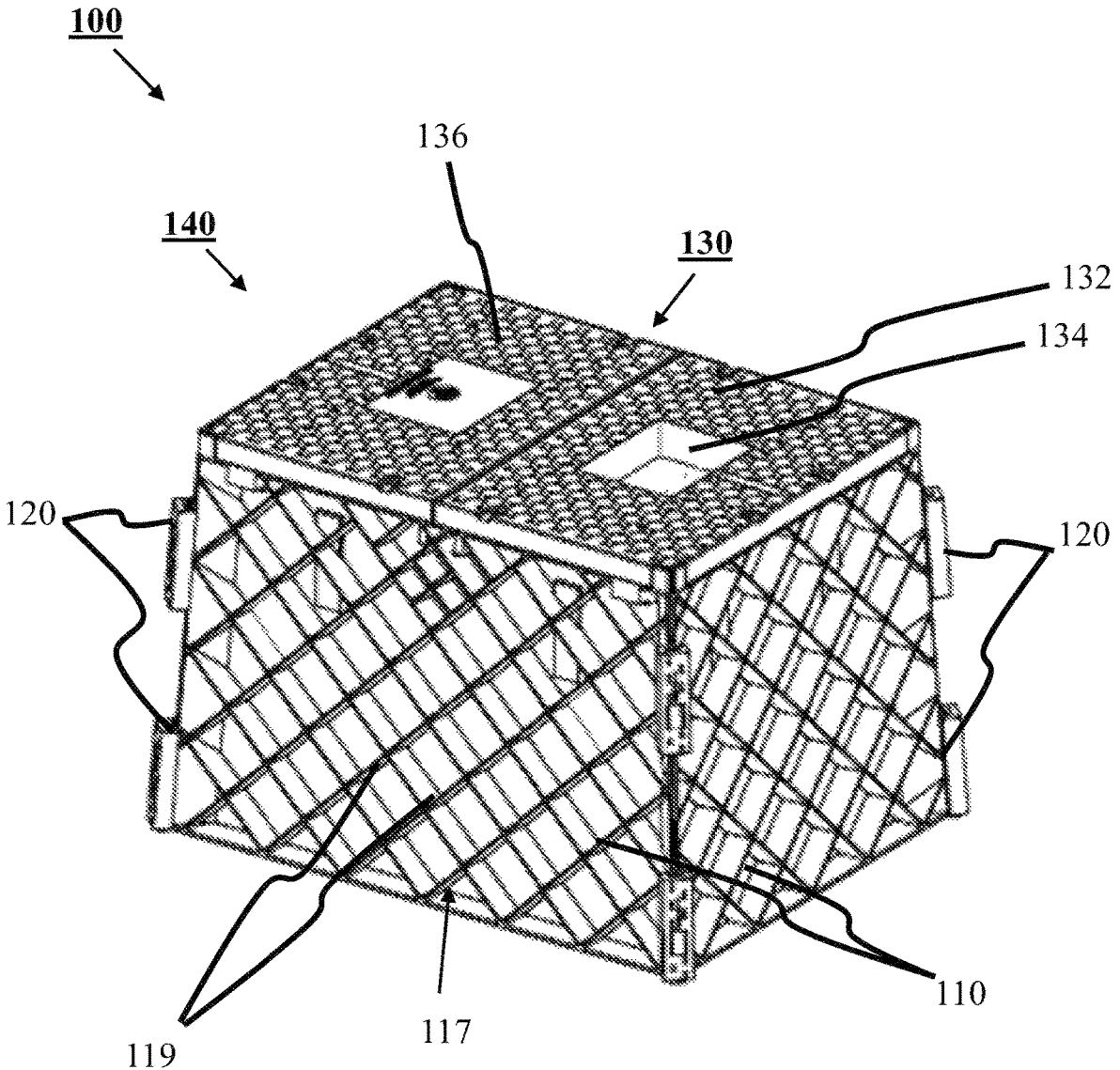
FIG. 1 provides a perspective view of an example modular utility vault system, in accordance with the present disclosure.
Figure 2:
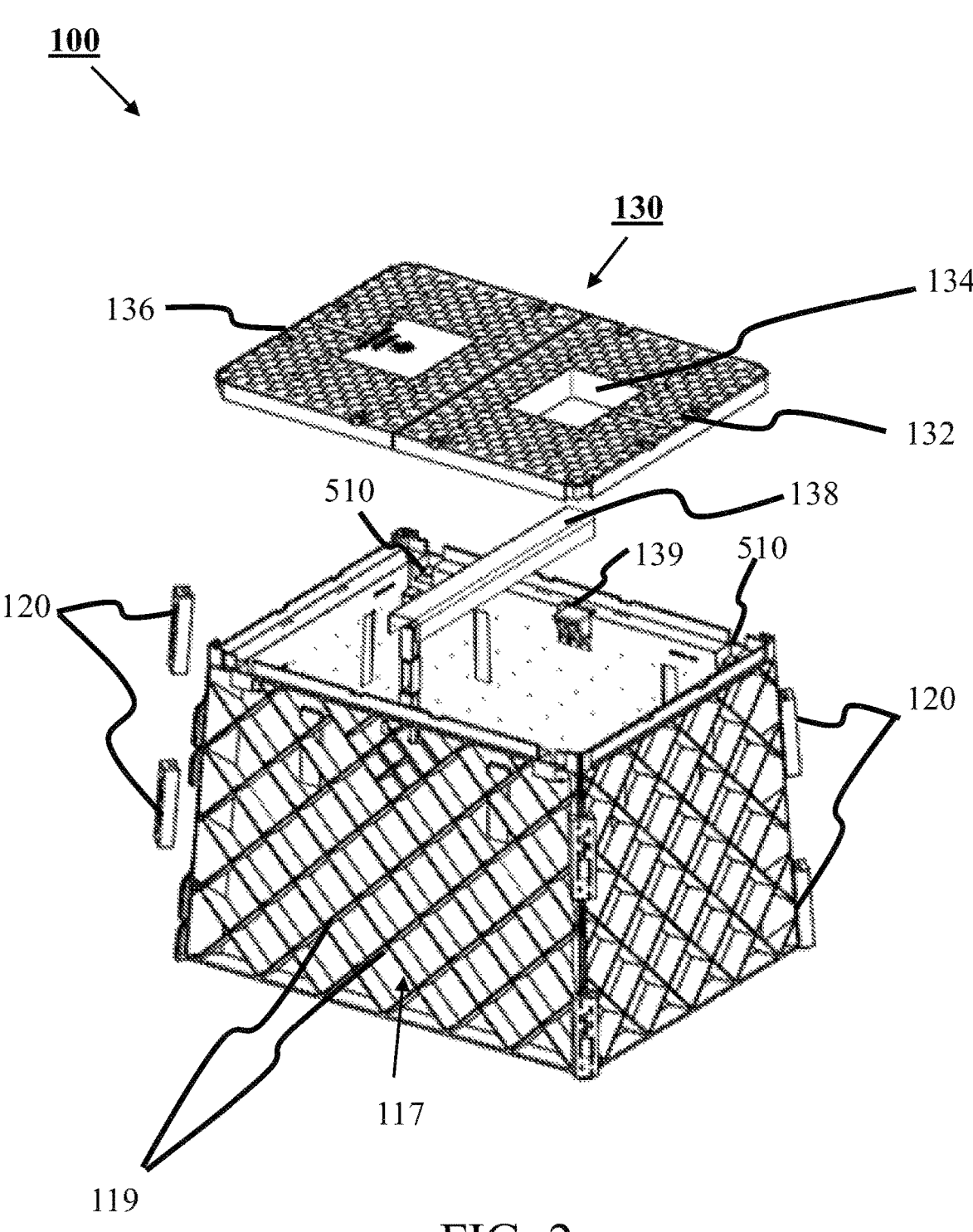
FIG. 2 provides an exploded view of an example modular utility vault system, in accordance with the present disclosure.

FIG. 1 shows a modular utility vault system 100 that can include a plurality of panels 110 and a cover panel 130. Generally, each of the panels 110 is joined to three additional panels, such that the four panels together create the walls of an enclosure 140. The cover panel 130 can include a mounting section 132 and a cover section 136. For example, the cover panel 130 can be a split cover panel. The mounting section can include an access opening 134 and can be a pedestal or cabinet mounting section configured to mount a pedestal or cabinet or the like. For example, the access opening 134 can allow for cables and/or fiber to pass from the enclosure 140 to an above-ground pedestal or cabinet. FIG. 2 shows an exploded view of the vault system 100 of FIG. 1.

In some embodiments, as illustrated in FIG. 1, each of the plurality of panels 110 can further include of plurality of strengthening ribs 119 disposed on an outer side 117 of the panel 110. Each of the plurality of strengthening ribs 119 can be skew to at least one of the first side 112, second side 114, lower side 116, or upper side 118. The strengthening ribs 119 can be configured to extend from one side to another side. In addition, the strengthening ribs 119 can be configured to intersect with other strengthening ribs. For example, as illustrated in FIG. 1, the strengthening ribs 119 can form a generally diamond shaped grid pattern. Alternatively, or in addition, the strengthening ribs 119 can form a triangular pattern, rectangular pattern, pentagonal pattern, hexagonal pattern, honeycomb pattern, and the like, or any combination thereof.

Figure 3:
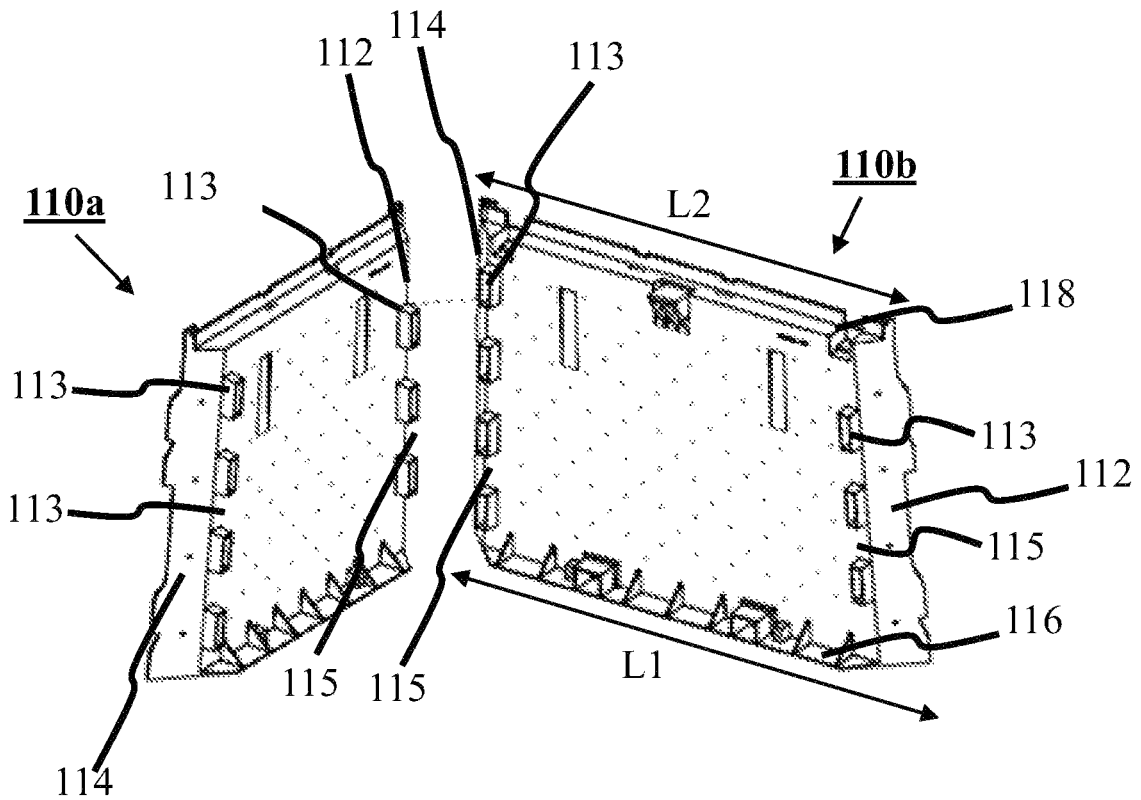
FIG. 3 provides an exploded view of an example modular utility vault system, in accordance with the present disclosure.

As shown in FIG. 3, each panel can include a first side 112, a second side 114, a lower side 116 having a first length L1, and an upper side 118 having a second length L2. The second length L2 can be less than first length L1. The first side 112 can include one or more pins 113 and one or more openings 115. The second side 114 can include one or more pins 113 and one or more openings 115. The first side 112 of a panel 110a of the plurality of panels is configured to abut the second side 114 of a second panel 110b thereby causing one or more pins 113 and one or more openings 115 of the first side 112 to mesh with the one or more pins 113 and one or more openings 115 of the second side 114. For example, the one or more pins 113 and the one or more openings 115 can form a joint, such as a box joint, finger joint, comb joint, dovetail joint, and the like. Alternatively, or in addition, the one or more pins 113 can be removably attached to the corresponding one or more pins 113 when the panel corner abut. For example, the one or more pins 113 can be attached by a bolt, pin, rod, or the like when corners of the panels abut and the pins 113 mesh and/or are otherwise aligned. In some embodiments, the first side 112 and the second side 114 of each of the plurality of panels 110 are beveled.

Figure 4A:
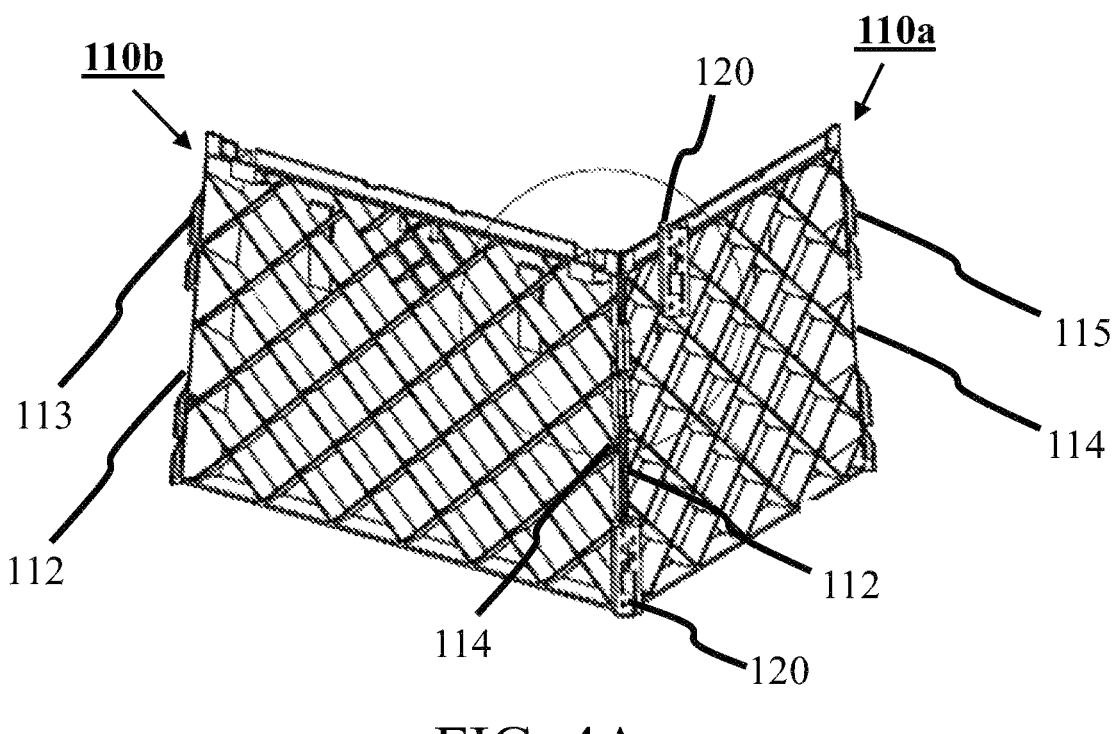
FIG. 4A provides an exploded view of an example modular utility vault system, in accordance with the present disclosure.
Figure 4B:
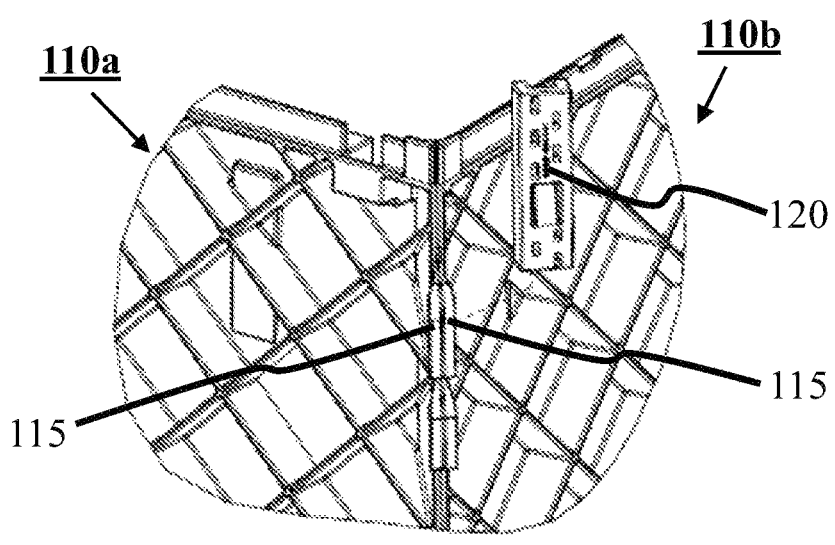
FIG. 4B provides a detail view of FIG. 4A.
Figures 10A, 10B, 10C, 10D:
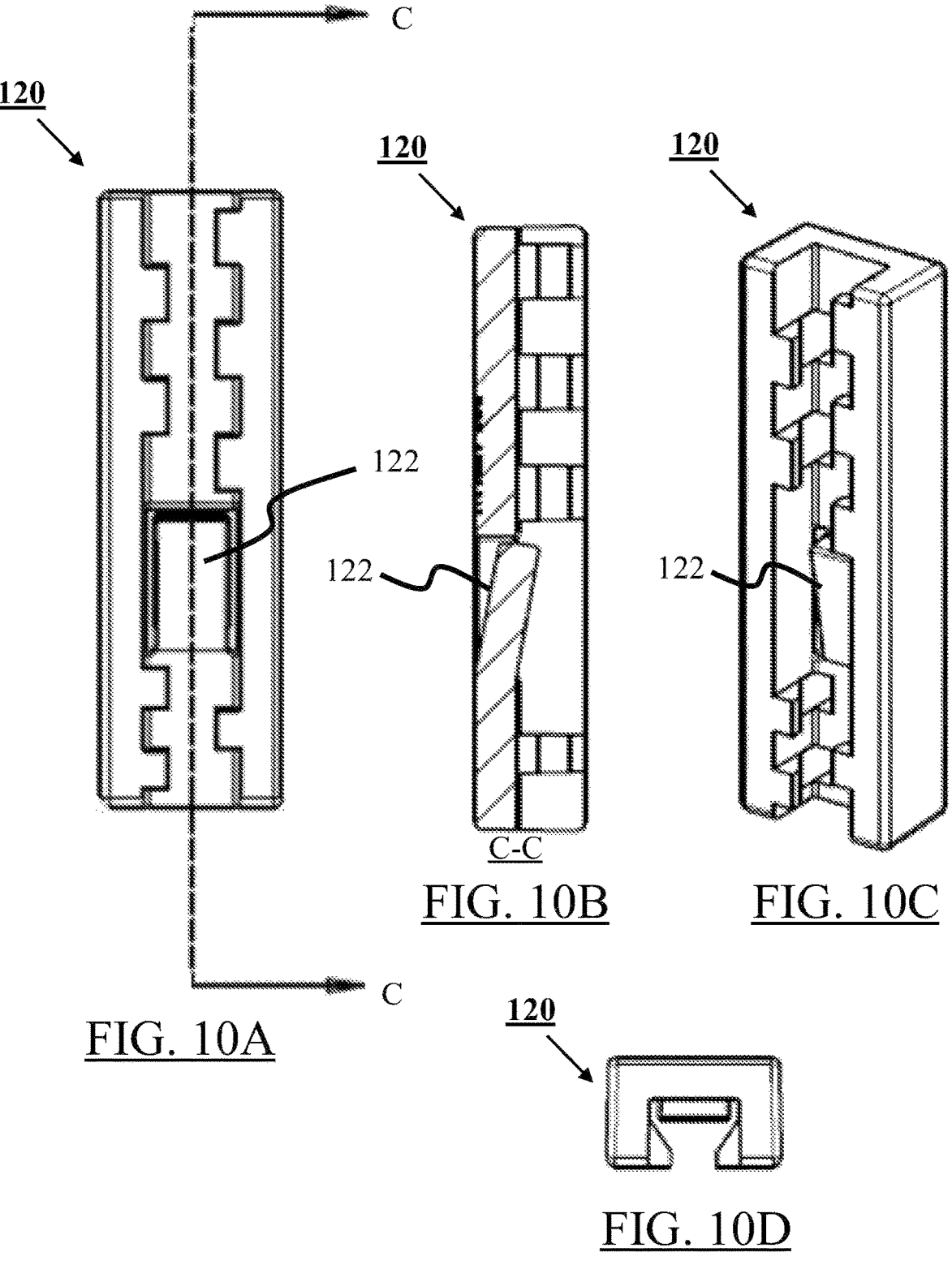
FIG. 10A provides a front view of an example clip, in accordance with the present disclosure.
FIG. 10B provides a cross sectional view of the clip of FIG. 10A
FIG. 10C provides a perspective view of an example clip, in accordance with the present disclosure.
FIG. 10D provides a top view of an example clip, in accordance with the present disclosure.

FIGS. 4A-4B show panel 110a joined to second panel 110b, the panels forming part of the enclosure 140. Each panel can include a first side 112 including a first protrusion 113, a second side 114 including a second protrusion 115. The first side 112 of a panel 110a of the plurality of panels is configured to abut the second side 114 of a second panel 110b thereby causing the first protrusion 113 to abut the second protrusion 115. The clip 120 can be configured to hold the first protrusion 113 to the second protrusion 115. For example, the clip 120 can be configured to slide over first protrusion 113 and second protrusion 115. The first protrusion 113 and the second protrusion 115 can form a generally Y-shaped protrusion when abutting. As shown in FIG. 10D, the clip 200 can have a corresponding generally Y-shaped opening configured to receive the first protrusion 113 and second protrusion 115. Alternatively, or in addition, the clip 200 can include a snap-fit mechanism to hold the clip 200 in place when holding the first protrusion 113 and second protrusion 115 together. The first protrusion 113 can be one of a plurality of first protrusions 113. The second protrusion 115 can be one of a plurality of second protrusions 115.

Figures 5A, 5B:
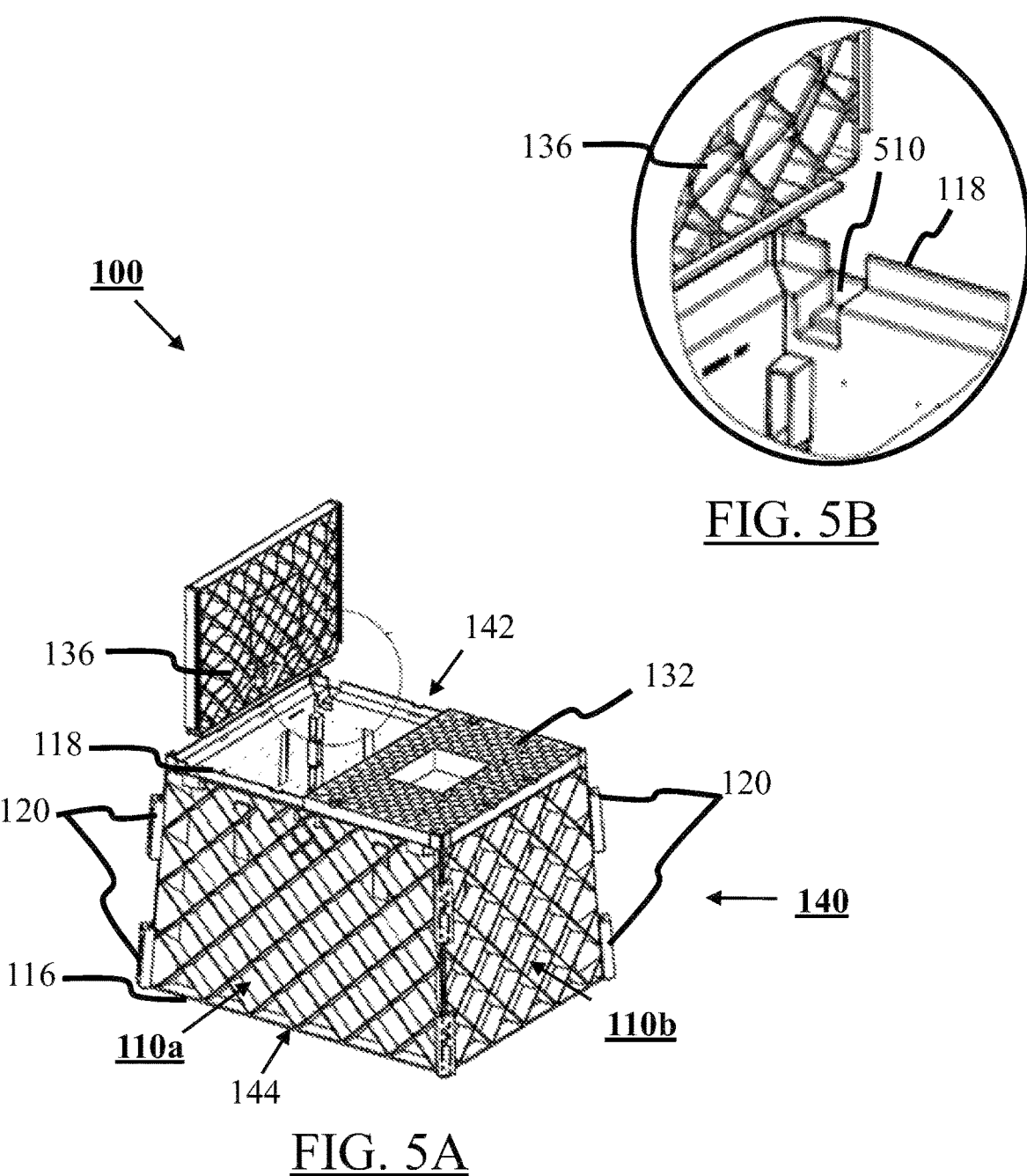
FIG. 5A provides an exploded view of an example modular utility vault system, in accordance with the present disclosure.
FIG. 5B provides a detail view of FIG. 5A.

As shown in FIG. 5A, the plurality of panels 110 can be configured to form an enclosure 140 having a generally trapezoidal prism shape having a rectangular top 142 defined by the upper sides 118 of the plurality of panels 110 and a rectangular bottom 144 defined by the lower sides 116 of the plurality of panels 110. In some embodiments, the rectangular top 142 can be smaller than the rectangular bottom 144. The cover panel 130 can be a rectangular panel with a length and width larger than or equal to the rectangular top 142.

As illustrated in FIG. 5B, the upper sides 118 can include one or more slots 510. The slots 510 can be configured to receive a portion of the cover panel 130. The cover panel 130 can be removeable. For example, the mounting section 132 and a cover section 136 can be removeable and configured to be turned vertically (as illustrated for cover section 136 in FIGS. 5A and 5B) and placed into one or more slots 510. In that way, the cover panel 130, or sections of cover panel 130 (e.g., mounting section 132 and cover section 136), can be held in place vertically in the slots 510 creating an opening in the rectangular top 142.

Figure 6:
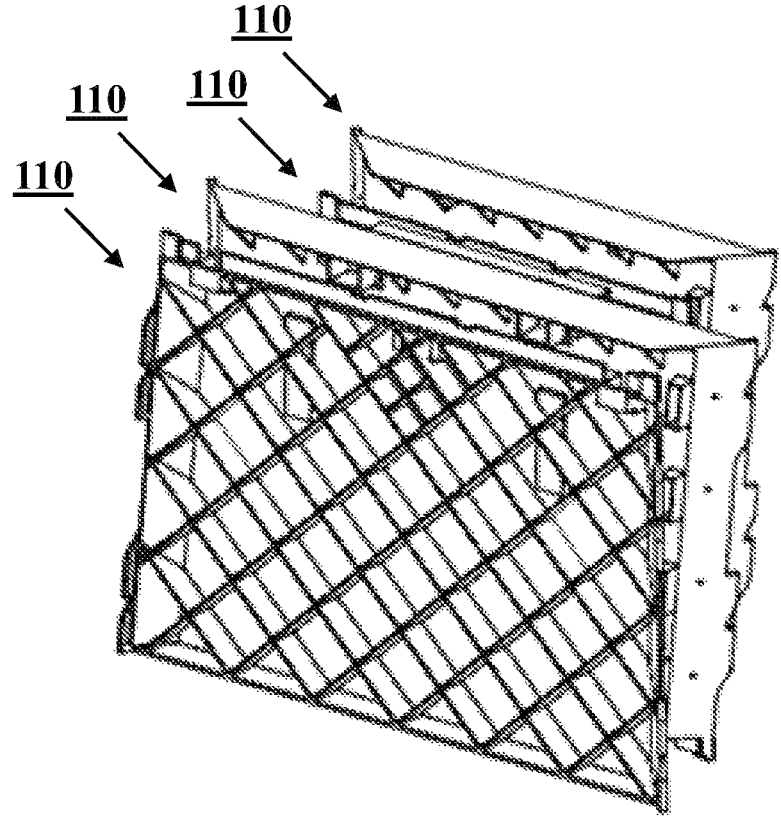
FIG. 6 provides an exploded view of an example panel, in accordance with the present disclosure.

FIG. 6 shows an exploded view of a plurality example panels 110. As illustrated in FIG. 6, the panels 110 can be separable and flat-packable.

Figure 7A:
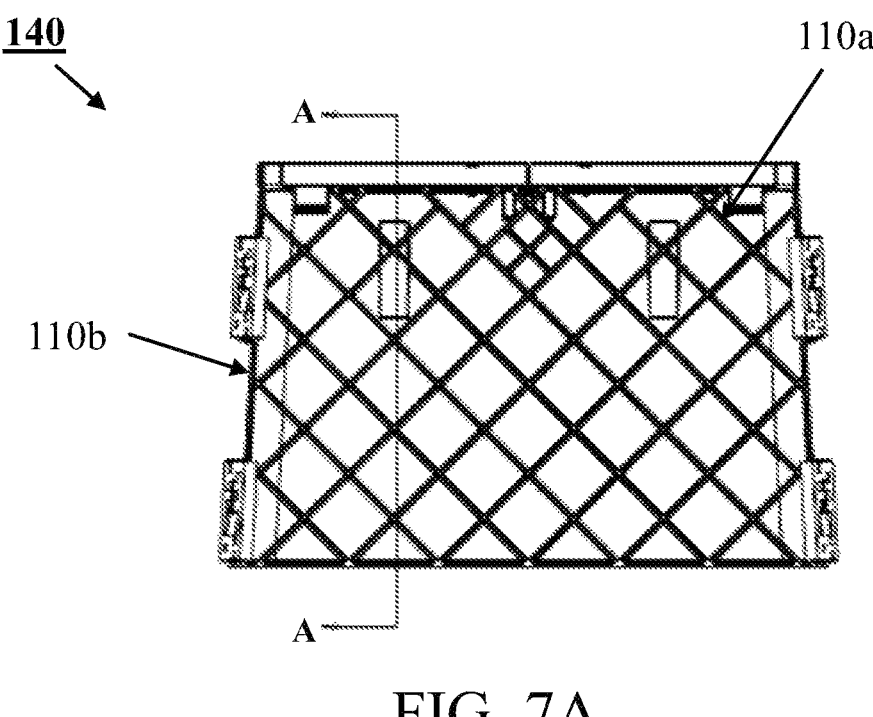
FIG. 7A provides a side view of an example modular utility vault system, in accordance with the present disclosure.
Figure 7B:
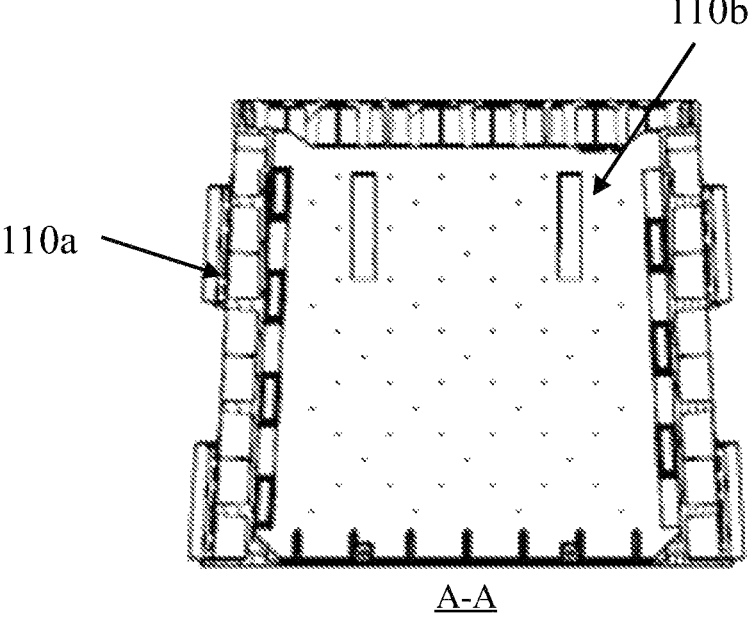
FIG. 7B provides a cross sectional view of FIG. 7A.

FIG. 7A shows a side view of an enclosure 140 formed from a plurality of panels 110, and FIG. 7B shows a cross section A-A of the panel of FIG. 7A.

Figure 8A:
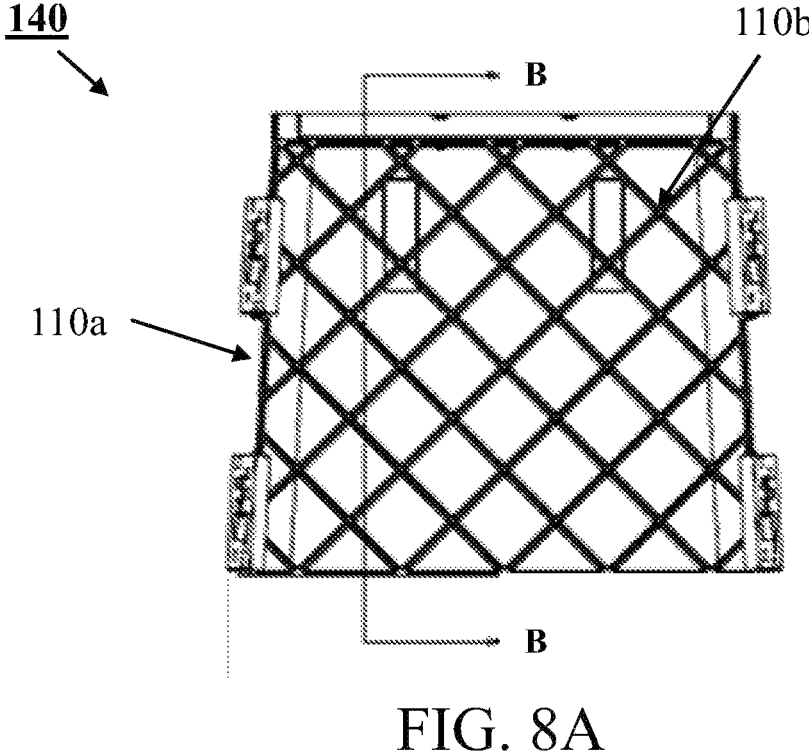
FIG. 8A provides a side view of an example modular utility vault system, in accordance with the present disclosure.
Figure 8B:
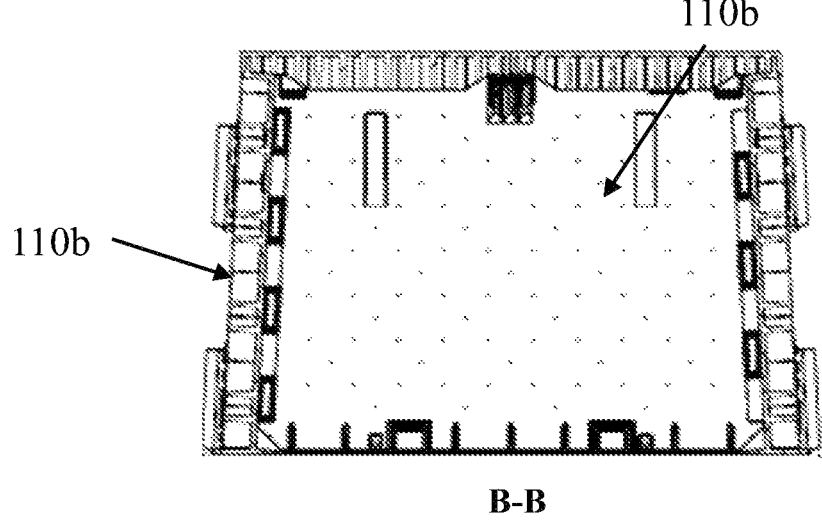
FIG. 8B provides a cross sectional view of FIG. 8A.

FIG. 8A shows another side view of an enclosure 140 formed from a plurality of panels 110, and FIG. 8B shows a cross section B-B of the panel of FIG. 7B.

Figures 9A, 9B, 9C:
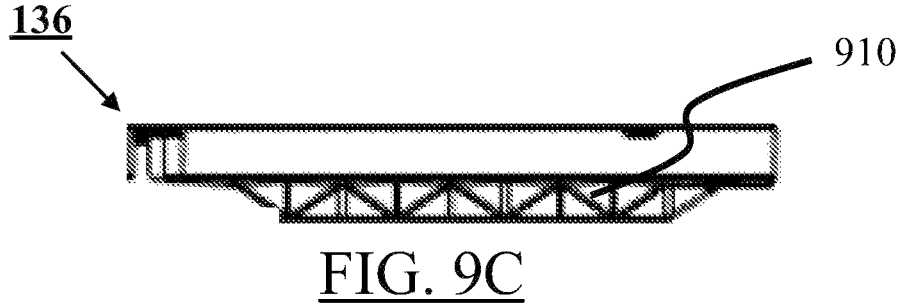
FIG. 9A provides a perspective view of an example cover panel, in accordance with the present disclosure.
FIG. 9B provides a top view of an example cover panel, in accordance with the present disclosure.
FIG. 9C provides a side view of an example cover panel, in accordance with the present disclosure.

FIGS. 9A-9C show cover section 136 of the cover panel 130. The cover panel 130, or sections of cover panel 130 (e.g., mounting section 132 and cover section 136) can include strengthening members 910. For example, as illustrated in FIGS. 9C the strengthening members can form a truss structure to strengthen the cover panel 130. Alternatively, or in addition, the strengthening members 910 can be similar to the strengthening ribs 119.

FIGS. 10A-10D show an example clip 120. In some embodiments, the clip 120 is configured to slide over a first protrusion 113 and a second protrusion 115 to securely clip the plurality of panels 110 together. FIG. 10B shows a cross section C-C taken from the clip as depicted in FIG. 10A. The clip can include a flexible tab 122 that locks the clip 120 in place to securely clip the plurality of panels 110 together. For example, the flexible tab 122 can be configured to form a snap fit with the first protrusion 113 and the second protrusion 115.

Figure 11A:
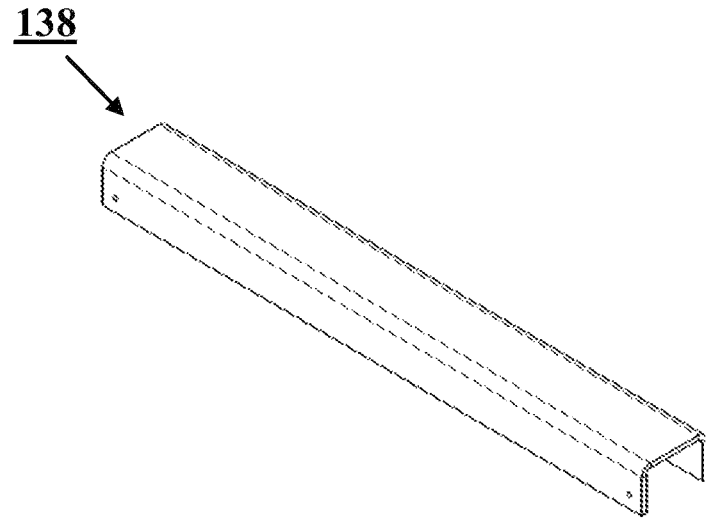
FIG. 11A provides a perspective view of support member, in accordance with the present disclosure.
Figure 11B:
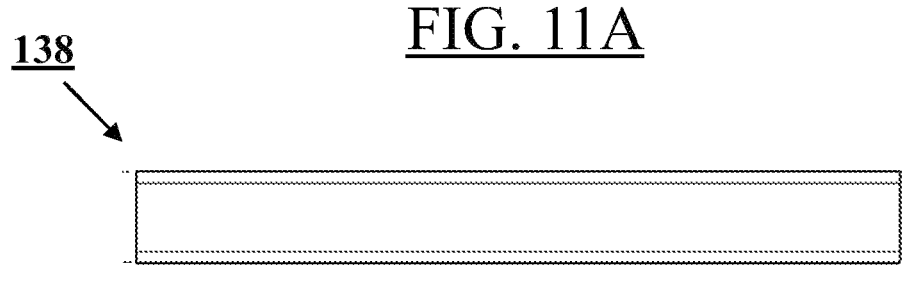
FIG. 11B provides a top view of support member, in accordance with the present disclosure.
Figure 11C:
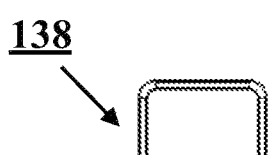
FIG. 11C provides a front view of support member, in accordance with the present disclosure.

FIGS. 11A-11C show a support member 138. The support member 138 can be configured to support the cover panel 130. For example, the support member 138 can rest on one or more protrusions 139 at the upper side 118 and can transverse between two walls of the enclosure 140. The support member 138 can be disposed below the location where the sections of cover panel 130 (e.g., mounting section 132 and cover section 136) meet. The support member 138 can be generally U-shaped.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A modular utility vault system comprising:
a plurality of panels each comprising:
    a first side comprising a first protrusion;
    a second side comprising a second protrusion, wherein the first side of a first panel of the plurality of panels is configured to abut the second side of a second panel of the plurality of panels, thereby causing the first protrusion to abut the second protrusion;
    a lower side having a first length; and
    an upper side having a second length, wherein the second length is less than first length;
a clip configured to hold the first protrusion to the second protrusion; and
a cover panel.

2. The vault system of claim 1, the cover panel comprising:
    a pedestal or cabinet mounting section comprising an access opening; and
    a cover section.

3. The vault system of claim 1, wherein the plurality of panels is configured to form an enclosure having a generally trapezoidal prism shape having a rectangular top defined by the upper sides of the plurality of panels and a rectangular bottom defined by the lower sides of the plurality of panels.

4. The vault system of claim 3, further comprising one or more slots disposed at the rectangular top, wherein the one or more slots is configured to receive a portion of the cover panel to hold the cover panel in an open configuration.

5. The vault system of claim 3, wherein the rectangular top is smaller than the rectangular bottom.

6. The vault system of claim 3, wherein the cover panel is a rectangular panel with a length and width larger than the rectangular top.

7. The vault system of claim 1, wherein the first side and the second side of each of the plurality of panels are beveled.

8. The vault system of claim 1, wherein each of the plurality of panels further comprises of plurality of strengthening ribs disposed on a side of the panel, each of the plurality of strengthening ribs being skew to at least one of the first side, second side, lower side, or upper side.

9. The vault system of claim 8, wherein the strengthening ribs form a diamond shaped grid pattern.

10. The vault system of claim 1, wherein the clip is configured to slide over a first protrusion and a second protrusion to securely clip the plurality of panels together.

11. The vault system of claim 1, wherein the cover panel is a split cover panel.

12. The vault system of claim 1, wherein the first side and the second side each further comprise one or more pins and one or more openings, wherein the one or more pins and the one or more opening are configured to form a box joint when the first side of a panel abuts the second side of a different panel.

13. A modular utility vault system comprising:
a plurality of panels each comprising:
    a first side comprising one or more first protrusions;
    a second side comprising one or more second protrusions, wherein the first side of a first panel of the plurality of panels is configured to abut the second side of a different panel of the plurality of panels, thereby causing a first protrusion to abut a second protrusion;
    a lower side having a first length;
    an upper side having a second length, wherein the second length is less than first length; and
    a plurality of strengthening ribs disposed on a side of the panel, each of the plurality of strengthening ribs being skewed to at least one of the first side, second side, lower side, or upper side;
    a plurality of clips, wherein the clips are configured to hold a first protrusion of the one or more first protrusions to a second protrusion of the one or more second protrusions; and
a cover panel comprising:
    a pedestal or cabinet mounting section comprising an access opening; and
    a cover section, and
wherein the plurality of panels are configured to form an enclosure having a trapezoidal prism shape having a rectangular top defined by the upper sides of the plurality of panels and a rectangular bottom defined by the lower sides of the plurality of panels.

14. The vault system of claim 13, wherein the rectangular top is smaller than the rectangular bottom.

15. The vault system of claim 13, wherein the cover panel is a rectangular panel with a length and width larger than the rectangular top.

16. The vault system of claim 13, wherein the first side and the second side of each of the plurality of panels are beveled.

17. The vault system of claim 13, wherein the strengthening ribs form a diamond shaped grid pattern.

18. The vault system of claim 13, wherein the plurality of clips are each configured to slide over a first protrusion and a second protrusion to securely clip the plurality of panels together.

19. The vault system of claim 13, wherein the cover panel is a split cover panel.

20. The vault system of claim 13, wherein the first side and the second side each further comprise one or more pins and one or more openings, wherein the one or more pins and the one or more opening are configured to form a box joint when the first side of a panel abuts the second side of a different panel.

* * * * *